United States Patent
Allen et al.

(10) Patent No.: US 9,929,999 B2
(45) Date of Patent: *Mar. 27, 2018

(54) AD HOC MESSAGE SHARING BETWEEN EMAIL AND SOCIAL NETWORKS

(71) Applicant: International Business Machines Corporation, Armonk, NY (US)

(72) Inventors: Corville O. Allen, Morrisville, NC (US); Lee N. Helgeson, Rochester, MN (US); Jenny S. Li, Danbury, CT (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/620,301

(22) Filed: Feb. 12, 2015

(65) Prior Publication Data

US 2015/0319127 A1 Nov. 5, 2015

Related U.S. Application Data

(63) Continuation of application No. 14/269,751, filed on May 5, 2014.

(51) Int. Cl.
*H04L 12/58* (2006.01)
(52) U.S. Cl.
CPC ............. *H04L 51/32* (2013.01); *H04L 51/36* (2013.01)
(58) Field of Classification Search
CPC ....... H04L 12/58; H04L 12/588; H04L 51/32; H04L 51/36
See application file for complete search history.

(56) References Cited

U.S. PATENT DOCUMENTS

| 7,954,058 | B2 | 5/2011 | Kalaboukis et al. |
| 9,252,973 | B1* | 2/2016 | Lin .......................... H04L 12/58 |
| 9,306,989 | B1* | 4/2016 | Jayaram ................ H04L 65/403 |
| 2004/0078448 | A1* | 4/2004 | Malik ..................... H04L 51/04 709/206 |
| 2004/0143472 | A1* | 7/2004 | Estrada .......... G06Q 10/063118 705/7.23 |
| 2006/0041625 | A1* | 2/2006 | Chen .................... G06Q 10/107 709/206 |

(Continued)

OTHER PUBLICATIONS

Office Action dated May 2, 2016 received in parent U.S. Appl. No. 14/269,751, 18 pages.

(Continued)

*Primary Examiner* — Jeong S Park
(74) *Attorney, Agent, or Firm* — Scully, Scott, Murphy & Presser, P.C.; Robert C. Bunker, Esq.

(57) ABSTRACT

There are provided a system, a method and a computer program product for sharing messages between an email client and a social network. The system prepares, based on an input from a sender, an email message by using the email client. The system identifies a portion of the email message to be shared with one or more users in the social network. The system tags the portion of the email message with identities of the one or more users in the social network. The system accesses the social network with credential of the sender. The system posts the portion of the email message on social network pages of the one or more users under a name of the sender.

7 Claims, 5 Drawing Sheets

(56) References Cited

U.S. PATENT DOCUMENTS

| | | | |
|---|---|---|---|
| 2006/0190546 A1* | 8/2006 | Daniell | G06Q 10/107 709/206 |
| 2007/0266097 A1 | 11/2007 | Harik et al. | |
| 2008/0172496 A1* | 7/2008 | Middleton | G06Q 30/02 709/246 |
| 2008/0184138 A1* | 7/2008 | Krzanowski | G06F 17/30873 715/760 |
| 2008/0192302 A1* | 8/2008 | Rohall | G06Q 10/107 358/402 |
| 2010/0169429 A1 | 7/2010 | O'Sullivan et al. | |
| 2014/0006525 A1* | 1/2014 | Freund | H04L 51/16 709/206 |
| 2015/0319126 A1* | 11/2015 | Allen | H04L 51/32 709/206 |

OTHER PUBLICATIONS

Method and System for Distributing Excerpts from a Message to Various Social Groups, IP.com, IPCOM000227209D, May 1, 2013, pp. 1-2.

Integration of Social Media and Email Communication, IP.com, IPCOM000219459D, Jul. 2, 2012, pp. 1-3.

List of IBM Patents or Patent Applications Treated as Related, dated Feb. 27, 2015, 2 pages.

Office Action dated Oct. 27, 2016 received in parent U.S. Appl. No. 14/269,751, 18 pages.

Office Action dated Mar. 30, 2017 received in parent U.S. Appl. No. 14/269,751, 16 pages.

Office Action dated Aug. 18, 2017 received in parent U.S. Appl. No. 14/269,751, 17 pages.

* cited by examiner

TO: _____

CC: _____

BCC: _____

SUBJECT: DON'T MISS MY HOUSEWARMING PARTY

DEFAULT CUSTOM EXPIRATION DATE: 10/01/2013
_____

HI ALL,
400 — I'M GOING TO HAVE A HOUSE WARMING PARTY THIS WEEK. PLEASE STOP BY. JUST BRING YOURSELF. I GOT TONS OF BEER AND FOOD!!! — 405
   [USER 1, USER 3, USER 4, USER 5]

USER 1,
HOW'S YOUR NEW JOB BTW? I HAVEN'T TALKED TO YOU FOR A LONG TIME. I THINK I MAY KNOW SOMEONE WHO WORKS IN YOUR NEW GROUP.

REGARDS,
USER 2

FIG. 4A

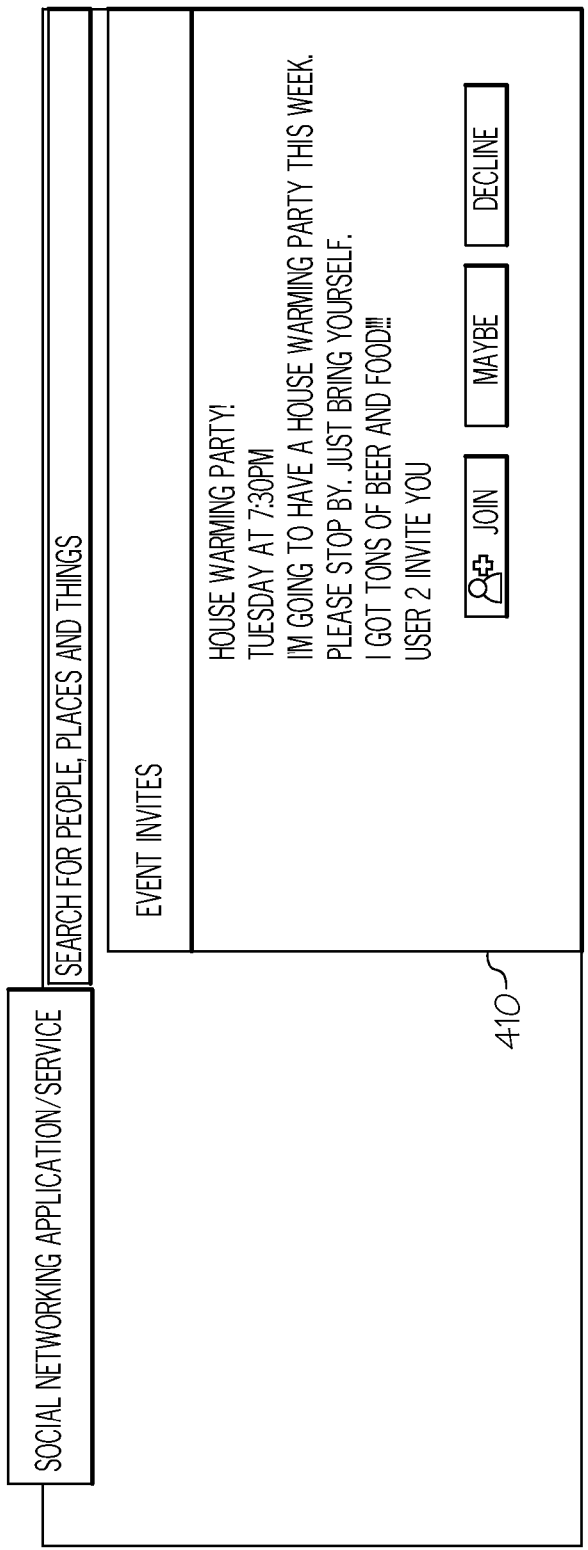

AD HOC MESSAGE SHARING BETWEEN EMAIL AND SOCIAL NETWORKS

BACKGROUND

This disclosure relates generally to managing email messages, and particularly to posting a portion of an email message to a social network as one or more postings.

BACKGROUND OF THE INVENTION

It is difficult for a user to share an email with others in ad hoc manner (i.e., not planned in advance but performed for a particular purpose). The most common way of sharing an email is to forward an email to another user who may need to know the email. Even though this forwarding of an email solves the problem (i.e., sharing an email with other users), a user that was copied ("cc" feature in an email client) on the email has to manually manage (e.g., delete, further forward, etc.) the email that was shared with him/her. Currently, a user is only allowed to automatically forward full email content to the individuals or the groups. A traditional email forwarding process is not flexible (i.e., can forward only full content of email) and is behind current technical savvy social network capabilities (e.g., making comments on a photograph, etc.). The user manually indicates the receivers' full e-mail addresses in order to send the full content of the email.

SUMMARY

There are provided a system, a method and a computer program product for sharing messages between an email client and a social network. In one embodiment, the system prepares, based on an input from a sender, an email message by using the email client. The system identifies a portion of the email message to be shared with one or more users in the social network. The system tags the portion of the email message with identities of the one or more users in the social network. The system accesses the social network with credential of the sender. The system posts the portion of the email message on social network pages of the one or more users under a name of the sender.

The system sends the email message to the recipients. The system posts the portion of the email message on the social network pages, wherein the sending email message and the posting occur concurrently.

In one embodiment, the method for sharing messages between an email client and a social network comprises preparing an email message, based on an input from a sender, by using the email client. A portion of the email message to be shared with one or more users in the social network is identified. The portion of the email message is tagged with identities of the one or more users in the social network. The social network is accessed with credential of the sender. The portion of the email message is posted on social network pages of the one or more users under a name of the sender.

In one embodiment, the computer program product for sharing messages between an email client and a social network comprises a computer readable storage medium. The computer readable storage medium is readable by a processing circuit and stores instructions run by the processing circuit. The instructions prepare, based on an input from a sender, an email message by using the email client. The instructions identify a portion of the email message to be shared with one or more users in the social network. The instructions tag the portion of the email message with identities of the one or more users in the social network. The instructions access the social network with credential of the sender. The instructions post the portion of the email message on social network pages of the one or more users under a name of the sender.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 4A illustrates an exemplary tag attached on a portion of an email message in one embodiment; and FIG. 4B illustrates an exemplary posting posted on a social network in one embodiment.

DETAILED DESCRIPTION

In one embodiment, there are provided a system, a method and a computer program product for sharing a portion (or a section) of an email message in an ad hoc manner, e.g., by tagging the portion of the email message with identities (e.g., names, email addresses, etc.) of one or more users in a social network. The social network refers to herein a computer platform or service that allows users to communicate online, e.g., by building relationships among the users who share interests and backgrounds, etc. The system (e.g., a computing system shown in FIG. 2) publishes the tagged portion of the email message on the social network, e.g., by posting the tagged portion on the social network pages of the one or more social network users. The system allows the sender of the email message to automatically send certain section(s) of the email messages to the recipients of the email message who are indicated on the email message. At the same time, the system also automatically sends the tagged portion to the one or more social network users, e.g., by posting the tagged portion on social network pages of the one or more social network users.

In one embodiment, by posting the tagged portion of the email message on the social network, the system allows the tagged portion of the email message to be shared in the social network. A sender of the email message may only write the email message, e.g., by using an email client. The system distributes the entire or portion of the email message to the recipients indicated on the email message and to the social network users concurrently. In one embodiment, some or all of the recipients and some or all of the social network users may overlap. In another embodiment, the recipients and the social network users may be entirely different. In one embodiment, the social network users may be members of different social networks. In one embodiment, the system sends the entire or portion of the email message to the recipients. At the same time, the system posts the entire or portion of the email message on social network pages of the social network users.

Figure 1:
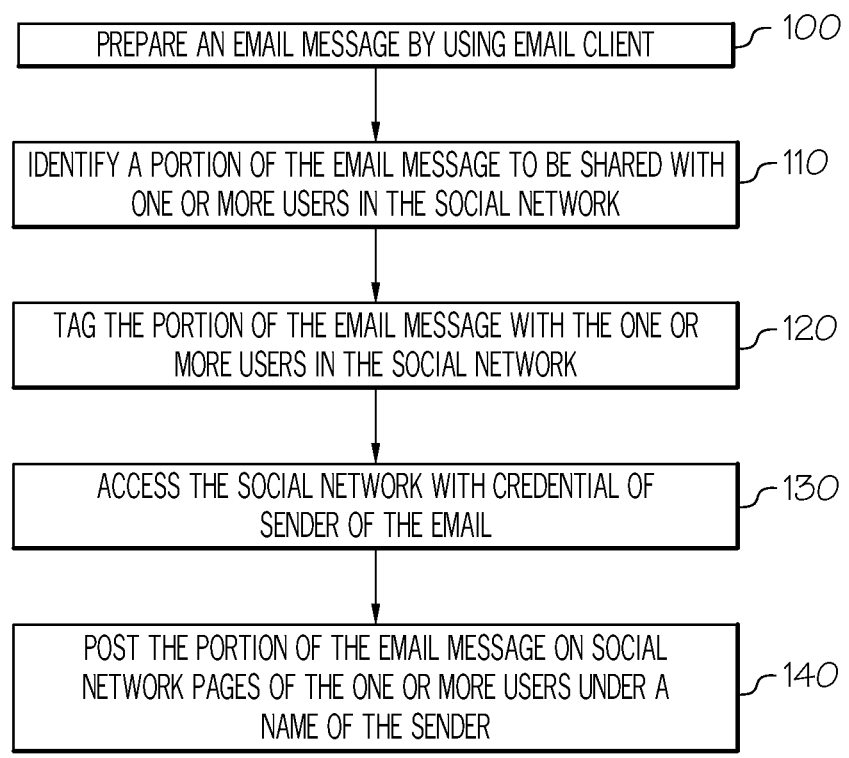
FIG. 1 illustrates a flowchart that describes a method for sharing messages between an email client and a social network in one embodiment.
Figure 3:
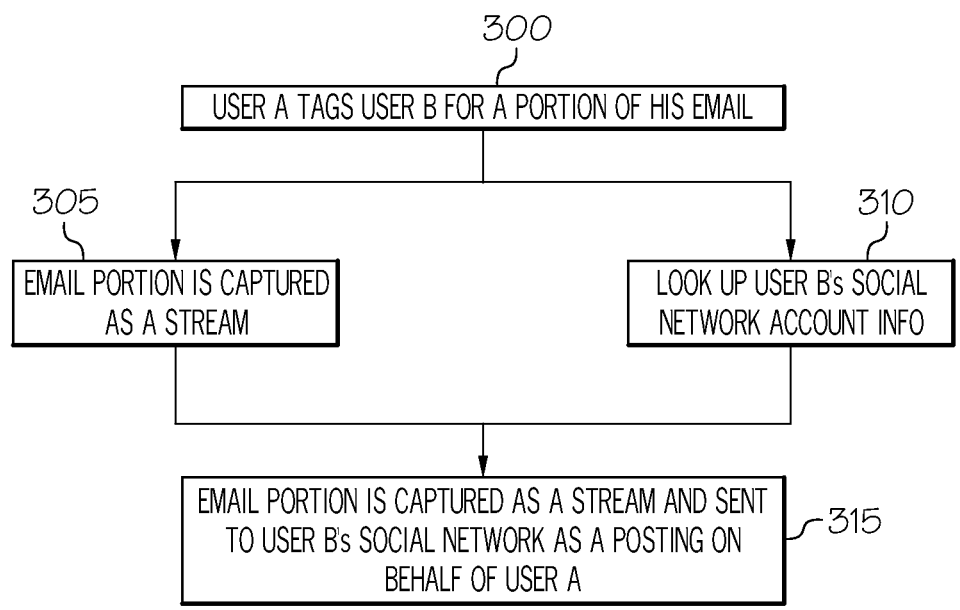
FIG. 3 illustrates another flowchart that describes a method for sharing messages between an email client and a social network in one embodiment.

FIG. 1 illustrates a flowchart that describes a method for sharing messages between an email client and a social network in one embodiment. FIG. 3 illustrates another flowchart that describes a method for sharing messages between the email client and that social network. At 100 in FIG. 1, a sender prepares an email message, e.g., by using the email client. At 110 in FIG. 1 and 300 in FIG. 3, the sender or the system identifies a portion of the email message to be shared with one or more users in the social network, e.g., by dragging a mouse device, etc. At 120 in FIG. 1 and 305 in FIG. 3, the system tags the identified portion of the email message with identities (e.g., email addresses, etc.) of the one or more users in the social network. The system may automatically copy or capture the tagged portion of the email message as a character stream. FIG. 4A illustrates an example tagged portion 400 of an example message. The example tagged portion indicates one or more identities of social network users 405. At 130 in FIG. 1 and 310 in FIG. 3, the system automatically accesses the social network with credential of the sender, e.g., login ID and password of the sender. At 140 in FIG. 1 and 315 in FIG. 3, the system posts the tagged portion of the email message on social network pages of the one or more users under a name of the sender. For example, the system pastes the copied or captured portion of the email message on a pre-defined social network posting template. There may exist a plurality of pre-defined social network posting templates. The system may randomly choose a pre-defined social network posting template among the plurality of the templates. A server hosting the social network publishes the template with the copied or capture portion of the email message as one or more postings on the social network pages of the social network users. FIG. 4B illustrates an example social network posting template 410 with the copied or captured portion 415 of the email message. By pasting the copied or captured portion of the email message on the template, the copied or captured portion of the email message is converted to a posting on the social network pages. In one embodiment, the posting includes, but is not limited to: a status message, a private message, an event or activity message, which represents the portion of the email message.

In one embodiment, the copied or captured portion of the email message can be sent to a plurality of social networks, when the social network users, who are identified in the tagged portion, do not use the same social network. The system maintains a list of contacts and relationships of the sender for each social network he/she belongs to. The system looks up each social network where a relationship exists between the sender and each social network user identified in the tagged portion. The system sends the copied or capture portion of the email message to one or more social network in which each identified social network user belongs to. In one embodiment, the copied or capture portion of the email message can be sent to a plurality of social networks with different social network posting templates. In one embodiment, the email message include a plurality of tagged portions with duplicated or different social network users.

A tag attached on the portion of the email message may include, but is not limited to:
(1) a name of the tag which represents a predefined set of social network users;
(2) a type of the social network;
(3) a key phrase of the portion, e.g., which is obtained by running a known electronic summary technique on the portion of the email message; and
(4) a title of the portion, e.g., which is obtained by running the same or different electronic summary technique on the portion of the email message.

In one embodiment, the system stores, e.g., in a server or computing device hosting the email client, the portion of the email message with the tag as metadata of the portion. In one embodiment, the system accesses an instant messenger with credential of the sender. The system determines whether the one or more social network users are currently logged in the instant messenger. The system sends, by using the instant messenger, an instant message that includes the portion of the email message to the one or more social network users.

In one embodiment, a user opens an email message, e.g., by using the email client. The user selects a portion(s) of the email message, e.g., by dragging a mouse device, etc. The system adds a set of shareable tags (e.g., email addresses of one or more social network users, names of the one or more social network users, etc.) on the portion(s) of the email message, e.g., by adding the email addresses of the social network users at the end of the portion. Based on the shareable tags added on the portion(s) of the email message, one or more social network posting, which includes the portion(s) of the email message, are posted on the social network pages of the social network users. Alternatively, the system sends the portion(s) of the email messages to the social network users, e.g., by using email or instant message, etc. An email server, with access to the sender's email, posts the portion(s) on the social network pages as one or more postings.

The following describes an example scenario that employs the methods shown in FIGS. 1 and 3.
1. A user opens an email message in his or her email client.
2. The user selects a portion of the email they want to share with social network users.
For example, the user right-clicks, on a mouse device, on the portion of the email message, and chooses a "share" menu (not shown). Then, the system displays, e.g., on a display device, etc., the "share" menu as follows:
i) a tag name which specifies a predefined set of social network users who may share the portion with the user;
ii) a media that can be used to publish the portion to the social network pages. The example media includes, but is not limited to: a corresponding social network(s), an email client(s), an instant messenger, etc.;
iii) a social network user, or set of social network users, or predefined group to share the portion with;
iv) a key phrase found within the portion, e.g., by using a known electronic summary technique on the portion;
v) an indication used to find similar content of the portion in a future email message or a future posting, e.g., by using a text mining technique; and
vi) a title—the title for the portion selected.
3. The user selects a "save tag" menu (not shown), which highlights the tagged portion and indicates where that portion is to be sent or posted.
4. The user chooses a "publish menu" to share that portion or publish the portion on the social network pages.
5. The system sends the portion to the social network users or posts the portion on the social network pages of the social network users.

Depending on a social network posting template selected by the sender, the social network users (indicated on the tag of the email message) can receive the same single posting or each different posting. For example, the system may choose each different template to include the portion(s) and sends the each different template with the portion(s) to each different user. Alternatively, the system posts the each different template with the portion(s) on corresponding social network pages. In one embodiment, the system automatically extracts a portion of the email message selected by the sender and automatically forwards the selected extracted portion to the social network users, e.g., by using email.

Figure 2:
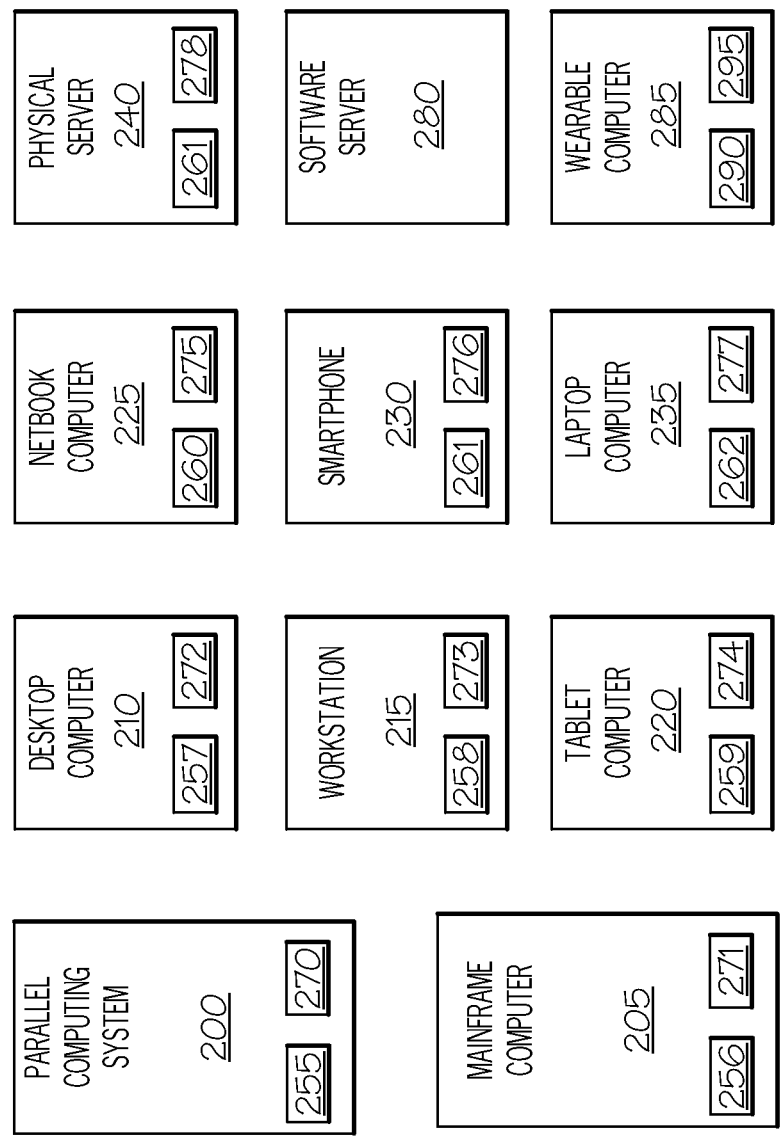
FIG. 2 illustrates exemplary hardware configurations for performing a method shown in FIG. 1 in one embodiment.

In one embodiment, a computing system may run the method illustrated in FIG. 1. FIG. 2 illustrates examples of the computing system. Examples of the computing system may include, but are not limited to: a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 256 and at least one memory device 274, a netbook computer 225 including at least one processor 260 and at least one memory device 275, a smartphone 230 including at least one processor 261 and at least one memory device 276, a laptop computer 235 including at least one processor 262 and at least one memory device 277, a physical server 240 including at least one processor 261 and at least one memory device 278, a software server 280, e.g., web server, HTTP server, application server, or a wearable computer 285, e.g., smartwatch, etc., including at least one processor 290 and at least one memory device 295.

In one embodiment, the methods shown in FIGS. 1 and 3 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 1 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for sharing messages between an email client and a social network, the method comprising:
   preparing, based on an input from a sender, an email message by using the email client;
   identifying a portion of the email message to be shared with users in the social network;
   tagging the portion of the email message with identities of the users in the social network, the tagging comprising attaching a tag comprising a tag name representing a predefined set of social network users and a media type used for publishing the portion of the email message, the tagging further comprising selecting a plurality of templates into which the portion of the email message is pasted wherein at least two of the users in the social network receive a different template;
   accessing the social network with credential of the sender;
   posting the portion of the email message pasted on the plurality of templates on social network pages of the predefined set of social network users under a name of the sender,
   wherein a processor connected to a memory device is configured to perform the preparing, the identifying, the tagging, the accessing and the posting,
   wherein at least one of the predefined set of social network users whose social network pages receive the posting is different from the sender,
   wherein the social network comprises a plurality of different social networks and the identities of the users tagged in the portion of the email message do not use a same social network,
   wherein the email message comprises a plurality of tagged portions tagged with different sets of social network users,
   wherein an untagged portion of the email message is sent by email to at least one of the recipients; and
   sending the email message to the recipients; and
   posting the portion of the email message on the social network pages,
   wherein the sending the email message and the posting occur concurrently.

2. The method according to claim 1, wherein the tag further comprises:
   a key phrase of the portion; and
   a title of the portion.

3. The method according to claim 1, further comprising:
   storing, in a server device, the portion of the email message with the tagging.

4. The method according to claim 1, further comprising:
   accessing an instant messenger with credential of the sender;
   determining whether users are currently logged in the instant messenger; and
   sending, by using the instant messenger, an instant message that includes the portion of the email message to the users.

5. The method according to claim 1, wherein the posting on the social network pages includes at least one of: a status message, a private message, and an event or activity message, which represent the portion of the email message.

6. The method according to claim 1, further comprising:
   converting the portion of the email message to the posting on the social network pages.

7. The method of claim 1, further comprising:
   allowing the sender to select the portion of the email message displayed on an email client user interface;
   responsive to the sender selecting the portion of the email message, displaying a menu comprising at least the tag name representing a predefined set of social network users, the media type used for publishing the portion of the email message, and an indication to find content determined to be similar by a text mining technique to the portion in a future email message.

* * * * *